Aug. 29, 1967 — W. S. GILES — 3,338,228
VALVE STEM RETAINER LOCK
Filed Aug. 5, 1964 — 2 Sheets-Sheet 1
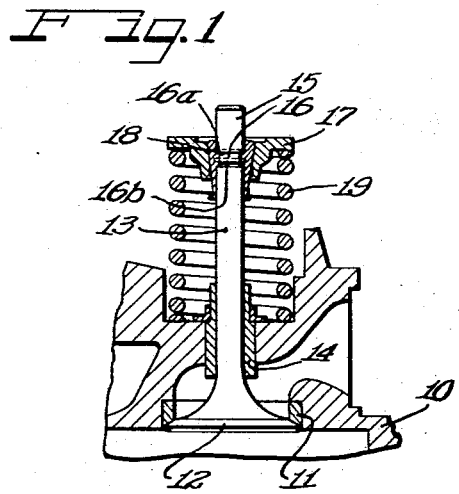
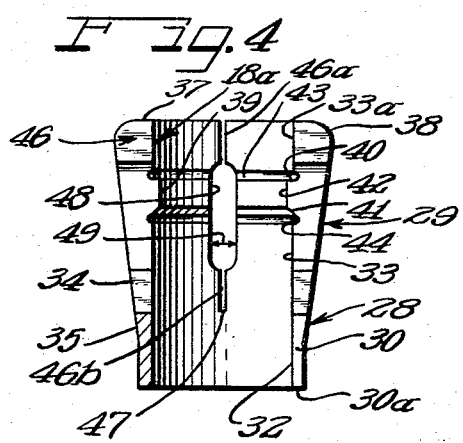
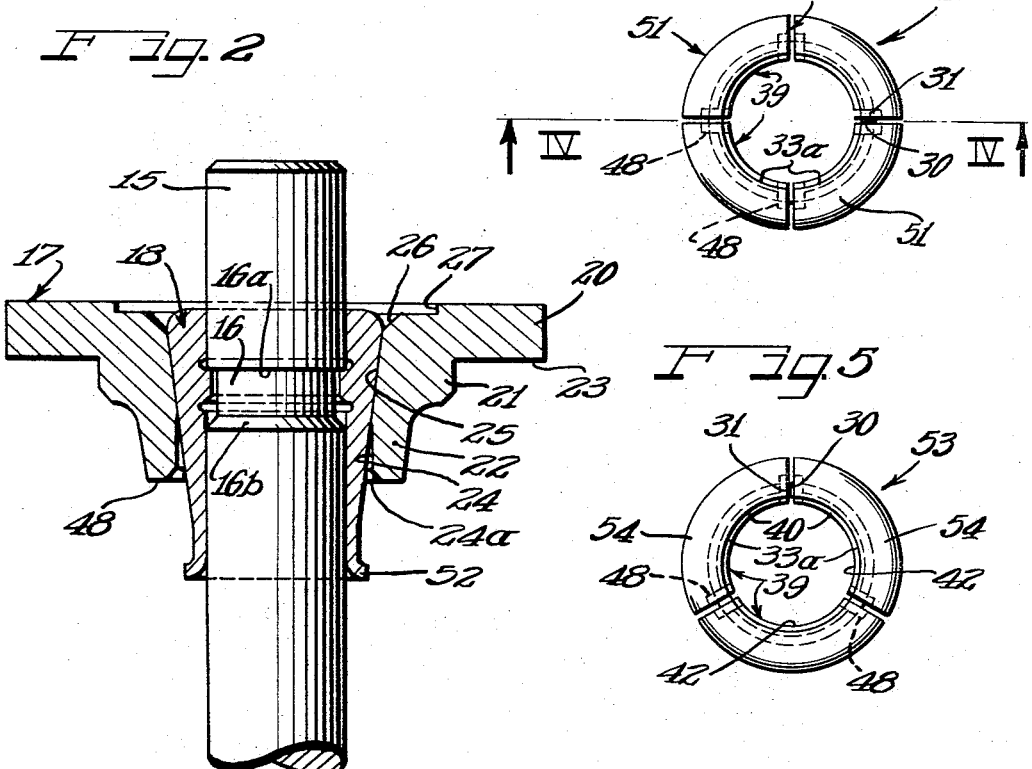
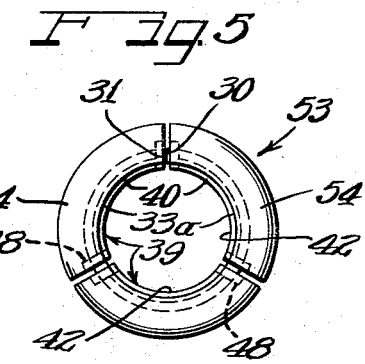
INVENTOR.
William S. Giles
BY *Hill, Sherman, Merani, Gross & Simpson* ATTORNEYS Aug. 29, 1967 W. S. GILES 3,338,228
VALVE STEM RETAINER LOCK
Filed Aug. 5, 1964 2 Sheets-Sheet 2
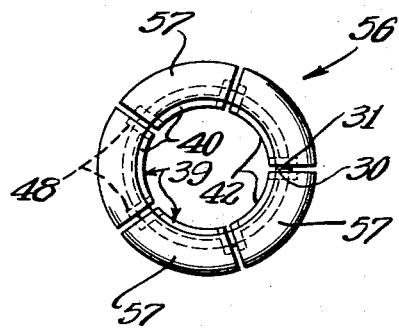
Fig.6
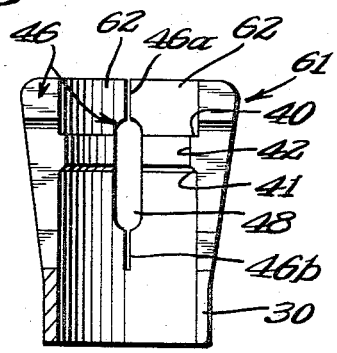
Fig.8
Fig.9
Fig.10
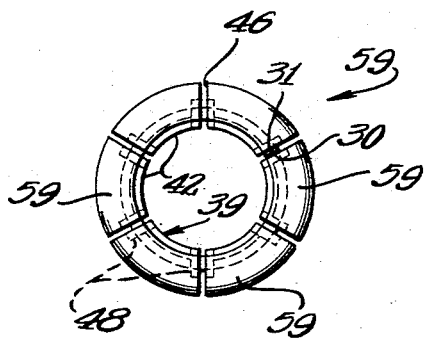
Fig.7
INVENTOR.
William S. Giles
BY *[signature]* ATTORNEYS

United States Patent Office 3,338,228
Patented Aug. 29, 1967

3,338,228
VALVE STEM RETAINER LOCK
William S. Giles, Highland Heights, Ohio, assignor to TRW Inc., a corporation of Ohio
Filed Aug. 5, 1964, Ser. No. 387,680
6 Claims. (Cl. 123—188)

This invention generally relates to a one-piece valve spring retainer lock and a one-piece lock and spring retainer assembly and more particularly relates to a one-piece valve spring retainer lock and a one-piece lock and spring retainer assembly wherein the retainer lock has an expansible upper portion.

In conventional poppet valve assemblies, the tip end of the poppet valve stems have spring retainers thereon to form the bottoming means for the valve closing springs. For this purpose, the stems are provided with peripheral grooves near their tip ends for receiving the ribs or beads of valve spring retainer locks. The locks when positioned around the valve stems provide a wedge fit in the tapered bores of their valve spring retainers to lock the spring retainers on the valve stem. Known one-piece valve retainer locks, which may be snapped onto the stems into interlocking position therewith, have segmented upper portions formed by a plurality of longitudinally extending constant width slots spaced predetermined distances apart. The segmented upper portion of this type of one-piece valve retainer lock, is expanded by placing the prongs of a prong tool within the slots to spread the slots and thereby increase the radius of the lock upper portion to disengage the lock from locking engagement with the valve stem.

The present invention provides an improved one-piece expansible arcuate finger valve retainer lock having greater strength and oil retention properties as well as greater flexibility for easier assembly and removal thereof by forming the slots that form the segmented arcuate portions with narrow and wide portions.

Therefore, it is an object of the present invention to provide a one-piece valve spring retainer lock having a plurality of arcuate expansible finger portions with the fingers separated by slots having narrow and wide portions.

It is another object of the present invention to provide a tubular valve spring retainer lock having a plurality of spreadable arcuate fingers which are separated by narrow and wide slots.

It is still another object of the present invention to provide a one-piece valve spring retainer lock with a split tubular base and having a plurality of expansible and contractible arcuate segments extending longitudinally from the base with the arcuate segments being separated by narrow and wide grooves and said arcuate segments having internal ribs spaced inwardly a predetermined distance from the end thereof and said arcuate segments being thickened as they approach their ends for providing a frusto-conical external surface to be wedged seated in a tapered bore of a spring retainer.

It is still another object of the present invention to provide a steel or aluminum one-piece spring retainer lock with a slotted expansible upper end containing locking ribs for seating in a valve stem groove and providing elongated wedge gripping areas located completely on one side of the ribs with each of said slots having a first narrow portion extending from the end of the expansible end and then a wide second portion having a width greater than at least two times the width of the narrow slot portion.

It is another specific object of the present invention to provide a valve spring retainer lock having a split ring tubular base portion a tubular upper portion extending from said base portion and having an inner diameter equal to and concentric with the inner diameter of the tubular base portion and having a thickness that gradually increases as the upper portion extends away from the base portion with rib means extending inwardly from the diameter of the upper portions spaced a predetermined distance inwardly from the end thereof and at least three slots formed in said upper portion and extending the length thereof with said slots having a first and second narrow portion and an intermediate wide portion which has a width at least twice the width of the narrow portion.

It is another specific object of the present invention to provide a valve spring retainer lock having a split ring tubular base portion a tubular upper portion extending from said base portion and having an inner diameter equal to and concentric with the inner diameter of the tubular base portion and having a thickness that gradually increases as the upper portion extends away from the base portion with rib means extending inwardly from the diameter of the upper portions spaced a predetermined distance inwardly from the end thereof and at least three slots formed in said upper portion and extending the length thereof with said slots having a first narrow portion and a wide portion which has a circumferential length greater than the longitudinal width with its width being at least twice the circumferential width of the narrow portion.

Another specific object of this invention is to provide a spring retainer and lock assembly with the lock having different sized slots and said assembly being adapted to be snapped onto a valve stem and locked into the stem groove without the aid of tools.

Other objects, features and advantages of the present invention will become more apparent to the skilled artisan after a careful consideration of the following description when taken in conjunction with the drawings wherein like reference numerals refer to like and corresponding parts.

In the drawings:

FIGURE 1 is a partial longitudinal cross-sectional view with parts in elevation of a poppet valve assembly equipped with a valve spring retainer assembly constructed in accordance with the principles of the present invention;

FIGURE 2 is an enlarged partial longitudinal cross-sectional view with parts in elevation illustrating the manner in which the retainer lock of the present invention cooperates with the valve stem;

FIGURE 3 is a top elevational view of a retainer lock constructed in accordance with the principles of the present invention;

FIGURE 4 is a longitudinal cross-sectional view with parts in elevation of the retainer lock constructed in accordance with the principles of the present invention and taken along lines IV—IV of FIGURE 3;

FIGURE 5 is another embodiment of a retainer lock constructed in accordance with the principles of the present invention;

FIGURE 6 is a top elevational view similar to FIGURE 3 of another embodiment of a retainer lock constructed in accordance with the principles of the present invention;

FIGURE 7 is a top elevational view similar to FIGURE 3 of still another retainer lock constructed in accordance with the principles of the present invention;

FIGURE 8 is a longitudinal cross-sectional view with parts in elevation of still another retainer lock constructed in accordance with the principles of the present invention;

FIGURE 9 is a longitudinal cross-sectional view with parts in elevation of still another retainer lock constructed in accordance with the principles of the present invention; and FIGURE 10 is a longtidudinal cross-sectional view with parts in elevation of another embodiment of a retainer lock constructed in accordance with the principles of the present invention.

As shown in the drawings:

Referring to FIGURE 1, reference numeral 10 generally indicates an engine part such as for example, a portion of the cylinder head of an internal combustion engine.

Seated within an appropriate recess in the cylinder head 10 is an annular valve seat 11 composed of a material capable of withstanding high-temperature and corrosion conditions to which the valve assembly is subjected. A poppet valve 12 is seated against the valve seat 11 and has a rod-like stem portion 13 slidably received within a valve stem guide 14. The top end 15 of the stem 13 has a conventional retainer lock groove 16 having a flat top annular wall 16a and a lower frusto-conical wall 16b diverging towards the valve 12. A tubular valve spring retainer 17 surrounds and is locked to the valve stem 13 by a valve stem spring retainer lock 18, which will hereinafter be described in greater detail. A coil spring 19 surrounds the stem 13 and has one end bottomed against the retainer 17 and the opposite end bottomed against a seat in the cylinder head 10. The spring holds the valve in its closed position.

Referring to FIGURES 1 and 2, the spring retainer 17 has three concentric cylindrical portions 20, 21 and 22 with the upper portion 20 having an annular flat shoulder or abutment surface 23 adapted to engage the one end of the spring 19. The lock receiving bore of the retainer 20 is provided with an inner cylindrical portion 24 having a beveled mouth 24a, a frusto-conical portion 25 diverging from the cylindrical portion 24 and extending the major length of the retainer bore to a short frusto-conical wall portion 26 diverging from said wall portion 25 to a short cylindrical counterbore 27.

Referring to FIGURES 2–4, the one-piece tubular retainer lock 18 has a valve stem cylindrical receiving bore 18a therethrough. The lock 18 has a split tubular base portion 28 and a segmented top portion 29. The split tubular base portion 28 has end walls 30 and 31 abutted together to form an interference seal fit with each other to prevent oil leakage therebetween. The thickness of the lower base portion extends uniformly from the bottom lock end 30a for a major portion thereof and gradually increases in thickness at the portion thereof adjacent to the segmented top portion 29. The base portion has an inner cylindrical wall bore portion 32.

The upper portion 29 has an outer wall surface 34 which diverges from the outer surface 35 of the base portion to present a frusto-conical configuration. Therefore, as illustrated, the top portion 29 gradually increases in thickness from the bottom or base portion 28 to its end 37 which is rounded as indicated by reference numeral 38. The upper portion 29 of the retainer lock 18 is segmented by four longitudinally extending equally spaced slots 46 extending for a distance greater than one-half the axial length of the retainer lock and preferably extending from the end 37 substantially through the entire top portion 29 to form four expensible arcuate segments 51. The slots 46 have end walls 47 terminating adjacent the base portion 28 and one of the slots 46 terminating with the base split ends 30 and 31 being in the longitudinal center thereof.

Inwardly spaced a predetermined distance from the end 37 are four arcuate ribs 39 extending radially inwardly from the arcuate segments and substantially the circumferential distance of said arcuate segments. The segmented upper portion 29 has an inner cylindrical wall bore portions 33 and 33a being concentric with and equal in diameter to the cylindrical inner wall bore portion 32 and providing inboard and outboard land areas on each side of the ribs 39. The ribs 39 each have a flat radial top face 40 and a bottom face 41 that diverges from the inner wall face 42 at an angle of approximately 30° towards the inner cylindrical wall 33 of the upper portion. Adjacent the top and bottom rib faces 40 and 41 respectively are arcuate relief grooves 43 and 44 which provide the ribs 39 with extra strength.

The top surfaces 40 of the ribs 39 are spaced inwardly from the end 37 such that the wall portion 33a has a length at least one fifth of the longitudinal axial length of the collet or retainer bore 18a. The inboard and outboard walls 33 and 33a provide frictional grasping surfaces for the lock.

The slots 46 are slots extending from the end 37 to their end wall 47 with an intermediate circumferentially wide slot portion 48 extending intermediate the circumferentially equal narrow saw slot portions 46a and 46b for a length greater than half the length of the slot 46 and having a circumferential width as indicated by numeral 49 at least twice the circumferential width of either of the saw slot portions 46a and 46b. The slots 46 provide the collet or retainer lock with flexibility and substantially reduces lock leaf thickness to reduce the assembly force required to install the collet lock assembly onto a valve stem to as low as 27 pounds. Also, the flexible collet or lock 18, provides a better stem seal because of its ability to conform more readily to the valve stem and also provides better gripping because of the inboard and outboard frictional surfaces 33 and 33a.

The retainer lock or collet 18 fits freely into the bore of the spring retainer 17 with the tubular base portion 28 of the lock having a free sliding fit in the cylindrical bore 24 and with the tapered segment top portion 28 of the lock having wedge fit engagement with the frusto-conical bore 25 of the retainer. When the top portion 29 of the lock is bottomed on the bore 25 of the retainer, the base 28 projects beyond the beveled mounth 24a of the bore 24 and if it is desired to maintain the lock and retainer in assembled relation, the end 30a of the lock is spread or flanged to form a lip 52 of larger diameter than the bore 24. This lip will cooperate with the large segmented end of the lock to hold the lock in the bore of the retainer while accommodating limited free endwise movement of the lock in the retainer.

It is of course understood that the retaining lip 52 may be eliminated from the lock whenever it is desired to supply the locks and the retainers in disassembled relation.

In the embodiment of FIGURE 5, a modified lock or collet 53 is provided which is identical with the lock 18 except that the top segmented portion 29 has three slots 46 therein providing three expansible arcuate segments 54 instead of the four segments 51 of the lock 18.

A further embodiment of FIGURE 6, a retainer lock 56, which is identical with the lock 18 has the upper segmented portion 29, provided with five slots 46 which divide the upper portion 29 into five expansible segments 57.

A still further embodiment of FIGURE 7, a lock 58, being identical with lock 18, has six slots 46 in the upper portion thereof forming six expansible arcuate segments or fingers 59.

Referring to FIGURE 8, a lock or collet 61 is provided with three to six equally spaced slots 46 in the upper portion thereof to form three to six expansible arcuate segments 62. The lock 61 is identical to the lock 18 with the relief grooves 43 and 44 adjacent the top and bottom surfaces of the ribs 39 eliminated therefrom.

Referring to FIGURE 9, a lock 64 is provided with three to six equally spaced slots 66 extending for substantially the entire length of the upper segmented portion 29 and dividing the upper segmented portion into three to six expansible and contractible arcuate segments or fingers 67. The slots 66 extend from the lock end 37 to their closed inner end 63 adjacent the lower lock portion 28. The inner end 63 forms a relatively wide cross slot portion 68 having a circumferential length as indicated by 69 greater than twice the longitudinal width as indicated by 71. Further, the longitudinal width 71 is at least twice the circumferential width 72 of the upper narrow saw slot portion 66a.

Referring to FIGURE 10, there is illustrated another lock or collet 73 having three to six equally spaced slots 74 therein extending substantially the entire length of the upper portion 29 to divide said upper portion into three to six expansible arcuate segments or fingers 76. The slots 74 have a relatively narrow saw slot upper portion 74a and a relatively wide cross slot obtuse angular inner lower end portion 78. The obtuse angular inner end portion 78 has a transverse circumferential cross slot portion 79 and an angular slot portion 81 extending upwardly towards the lock end 37 from one end of the slot portion 79 and forming an obtuse angle 82 therebetween. The transverse wide slot portion 79 has a longitudinal width 83 preferably equal to the circumferential width 84 of the angular wide slot portion 81. The widths 83 and 84 of the respective slot portions 79 and 81 are less than the length of the respective slot portions 79 and 81 and are also greater than twice the circumferential width 86 of the saw slot upper portions 74a.

However, in this embodiment, the split tubular base ends 30 and 31 are not in interference fit with each other but are spaced a predetermined distance apart and adjacent the cross slot portion 78, the slots 74 are provided at 87 with interfitting walls.

In operation, any one of the locks 18, 53, 56, 58, 61, 64 or 73 is slipped over the top end 15 of the valve stem 13. The tapered bottom faces 41 of the ribs 39 will automatically spread the arcuate segments of the segmented top portion 29 of the lock as they are pushed over the tip end 15 of the valve stem. The lock slides over the valve stem groove 16 whereupon the resiliency of the arcuate segments will snap the ribs 39 into the groove. It will be noted from FIGURE 2 that the groove 16 is wider than the rib 39 and that the flat top faces 40 of the ribs abut the flat shoulder 16a of the groove while the tapered bottom faces 41 of the ribs are spaced above the tapered bottom wall 16e of the groove. Also, it is noted that the groove 16 is deeper than the contracted position of the inner rib faces 42 so that the faces 42 are always spaced outwardly from the bottom of the groove.

The load spring 19, on the spring retainer 17, forces the retainer into wedge locking engagement with the lock segmented end 29. The wedge locking contracting force on the lock, first closes the gap between the split ends 30 and 31 of the locks 18, 53, 56, 58, 61 and 64 and closing the ends of the slot portions 74a at 86 into abutting relation. At the same time, the lock base 28 has an inner wall 32 thereof contracted into interference fit relation with the stem 13. Then the top segmented portion of the lock is contracted to bring the walls 33 and 33a of the segments into tight gripping engagement with the valve stem while the groove shoulder 16a thrust against the rib faces 40 to hold the lock against axial slipping on the stem. The actual locking of the lock on the stem 13 is accomplished by the frictional gripping action of the arcuate wall portions 32, 33 and 33a on the stem and the other only function of the ribs 39 are to hold the stem against slipping in the lock while this gripping force is being established.

To remove the lock and retainer from the valve stem, it is only necessary to remove the spring load on the retainer, as by collapsing the spring and to then drop the retainer down on the tubular end 28 of the lock. Then the tapered shoulder 16b of the stem groove contacts the tapered bottom faces 41 of the ribs 39 to spread the arcuate segments or fingers as the lock 18 is slid downwardly on the valve stem. Thus, a suitable removing tool can be inserted around the valve stem into the bore of the lock to frictionally engage the upper lock surfaces 33a and to maintain the segments in their expanded position as the assembly is retracted off the valve stem end 15.

Although the above invention was described in accordance with preferred embodiments thereof, it is apparent that modifications and variations may be effected without departing from the scope of the novel concepts of the present invention and it will be understood that I intend that this invention be limited only by the scope of the hereunto appended claims.

I claim as my invention:

1. A one-piece valve retainer lock comprising:
    a split tubular base portion having a pair of base end walls defining a split in the tubular base portion,
    a tubular upper portion extending from said base portion and having an inner wall of a diameter equal to and concentric with the inner diameter of the tubular base portion,
    said upper portion having a radial thickness that gradually increases from the base portion to the outer end of said upper portion,
    said upper portion defining an open-mouth end,
    a lock rib extending radially inwardly from the inner wall diameter of the upper portion and situated a predetermined distance axially inwardly from the open-mouth end of said upper portion, and
    at least three equally spaced slots formed in said upper portion extending substantially the length thereof to divide said upper portion into at least three radially expansible and contractible axially extending arcuate segments,
    said slots having
        first and second narrow saw slot portions, and
        a third wide slot portion extending intermediate said first and second slot portions,
        said third wide slot portion having a length greater than twice its width, and
        said third slot width being at least two times the circumferential width of the narrow saw slot portions.

2. A one-piece valve retainer lock comprising:
    a split tubular base portion having a pair of base end walls defining a split in the tubular base portion,
    said end walls forming a complementary interference seal fit with each other,
    a tubular upper portion extending from said base portion and having an inner wall of a diameter equal to and concentric with the inner diameter of the tubular base portion,
    said upper portion having a radial thickness that gradually increases from the base portion to the outer end of said upper portion,
    said upper portion defining an open-mouth end,
    a lock rib extending radially inwardly from the inner wall of the upper portion and situated a predetermined distance axially inwardly from said open-mouth end to form inboard and outboard stem gripping surfaces on the inner wall of said upper portion between said rib and said base portion, and between said rib and said open-mouth end, respectively,
    said rib having a flat radial side wall facing the open-mouth end, said outboard stem gripping surface extending longitudinally at least one-fifth the longitudinal length of the lock, said rib having an angular side wall facing the base portion, and at least three equally spaced slots formed in said upper portion extending substantially the length thereof to divide said upper portion into at least three radially expansible and contractible axially extending arcuate segments, one of said upper portion slots terminating with the base portion split in the center thereof, and said slots having
    first and second narrow saw slot portions, and
    a third wide slot portion extending intermediate said first and second slot portions,
    said third wide slot portion having a longitudinal length greater than twice its circumferential width, and
    said third slot circumferential width being at least two times the circumferential width of the narrow saw slot portions.

3. A one-piece valve retainer lock having a cylindrical valve stem receiving bore therethrough comprising:

a split tubular base portion having a pair of base end walls defining a split in the tubular base portion, said end walls forming a complementary interference seal fit with each other, a tubular upper portion extending from said base portion and having a radial thickness that gradually increases from the base portion to the outer end of said upper portion, said upper portion defining an open-mouth end, at least three equally spaced slots formed in said upper portion extending substantially the length thereof to divide said upper portion into at least three radially expansible and contractible axially extending arcuate segments, one of said upper portion slots terminating with the base portion split in the center thereof, said slots having
    first and second narrow saw slot portions, and
    a third wide slot portion extending intermediate said first and second saw slot portions,
    said third wide slot portion having a length greater than twice its width, and
    said third slot width being at least two times the circumferential width of the first and second narrow saw slot portions, and a lock rib extending radially inwardly from each of said arcuate segments and situated a predetermined distance axially inwardly from the open-mouth end to form inboard and outboard stem gripping surfaces on the inner wall of said upper portion between said rib and said base portion and between said rib and said open-mouth end, respectively, said ribs having flat radial top walls facing the open-mouth end, said outboard stem gripping surfaces extending longitudinally at least one-fifth the longitudinal length of the lock, and said ribs having angular bottom walls facing the base portion, and arcuate relief grooves adjacent the rib top and bottom walls.

4. A one-piece valve retainer lock having a valve stem receiving bore therethrough comprising:

a tubular base portion, a tubular upper portion extending from said base portion, said upper portion defining an open-mouth end, at least three slots formed in said upper portion to divide said upper portion into at least three radially expansible and contractible axially extending arcuate segments, said slots having a first narrow saw slot portion extending from said open mouth end, a second wide slot portion extending from the inner end of said first slot portion, a third wide slot portion extending from and at an angle to said second wide slot portion, said second and third wide slot portions having lengths greater than their widths, said second and third slot widths being at least two times the circumferential width of the narrow saw slot portion, and lock ribs extending radially inwardly from the inner wall of each upper portion arcuate segment and situated a predetermined distance axially inwardly from the open-mouth end to form inboard and outboard stem gripping surfaces on the inner wall of said upper portion between said rib and said base portion and between said rib and said open-mouth end, respectively, said ribs having top walls facing the open-mouth end and bottom walls facing the base portion.

5. A one-piece valve retainer lock having a cylindrical valve stem receiving bore therethrough comprising:

a tubular base portion, a tubular upper portion extending from said base portion and having a radial thickness that gradually increases from the base portion to the outer end of the upper portion, said upper portion defining an open-mouth end, at least three equally spaced slots formed in said upper portion extending substantially the length thereof to divide said upper portion into at least three radially expansible and contractible axially extending arcuate segments, said slots having a first narrow saw slot portion extending from said open mouth end, a second wide slot portion extending from the inner end of said first slot portion, a third wide slot portion extending upwardly toward the open end from and at an obtuse angle to said second wide slot portion, said second and third wide slot portions having lengths greater than their widths, and said second and third slot portion widths being at least two times the circumferential width of the narrow saw slot portion, lock ribs extending radially inwardly from the inner wall of the upper portion a predetermined distance axially inwardly from the open mouth end to form inboard and outboard stem gripping surfaces on the inner wall of said upper portion between said ribs and said base portion and between said ribs and said open-mouth end, respectively, said ribs having flat radial top walls facing said open mouth end and spaced axially inwardly from the open-mouth end at least one-fifth the axial length of the lock, angular bottom walls facing the base portion, and arcuate relief grooves adjacent the rib top and bottom walls.

6. A one-piece valve retainer lock comprising:

a tubular base portion, a tubular upper portion extending from said base portion and having an open mouth end, a lock rib extending radially inwardly from the inner wall of the upper portion and situated a predetermined distance axially inwardly from the open mouth end, at least three axially extending slots formed in said upper portion to divided said upper portion into at least three radially expansible and contractible axially extending segments, said slots each having a wide slot portion extending axially through the lock rib and beyond the top and bottom faces of the rib so as to divide the rib, and said slots each having narrow slot portions contiguous with and extending beyond the top and bottom of the wide slot portion, said narrow and wide slot portions coacting to reduce the assembly force required to install the lock while increasing the flexibility of the segments.

References Cited

UNITED STATES PATENTS

| 1,573,048 | 2/1926 | Fancher et al. | 279—41 |
| 1,965,718 | 7/1934 | Wiley | 123—188 |
| 2,827,891 | 3/1958 | Engemann | 123—188 |
| 2,829,899 | 4/1958 | Drew et al. | 279—188 |
| 2,844,134 | 7/1958 | Sietman | 123—188 |
| 3,222,770 | 12/1965 | Braid | 123—188 |

FOREIGN PATENTS 568,005  12/1923  France.

CARL W. TOMLIN, *Primary Examiner.*

A. V. KUNDRAT, *Assistant Examiner.*